(12) United States Patent
Su

(10) Patent No.: US 8,110,948 B2
(45) Date of Patent: Feb. 7, 2012

(54) POWER CONVERSION APPARATUS AND METHOD

(75) Inventor: Gui-Jia Su, Knoxville, TN (US)

(73) Assignee: UT-Battelle, LLC, Oak Ridge, CA (US)

( * ) Notice: Subject to any disclaimer, the term of this patent is extended or adjusted under 35 U.S.C. 154(b) by 407 days.

(21) Appl. No.: 12/399,486

(22) Filed: Mar. 6, 2009

(65) Prior Publication Data

US 2009/0251000 A1   Oct. 8, 2009

Related U.S. Application Data

(60) Provisional application No. 61/042,036, filed on Apr. 3, 2008.

(51) Int. Cl.
*H02J 3/00* (2006.01)
(52) U.S. Cl. ............................................ 307/84; 307/82
(58) Field of Classification Search .................... 307/82, 307/84
See application file for complete search history.

(56) References Cited

U.S. PATENT DOCUMENTS

| | | | |
|---|---|---|---|
| 3,543,131 A | 11/1970 | Johnston | |
| 3,548,275 A | 12/1970 | Inagaki et al. | |
| 3,551,779 A | 12/1970 | Campbell | |
| 3,708,685 A | 1/1973 | Miller et al. | |
| 3,808,481 A | 4/1974 | Rippel | |
| 3,815,001 A | 6/1974 | Jamieson | |
| 3,848,166 A | 11/1974 | Jamieson | |
| 4,030,021 A | 6/1977 | Akamatsu | |
| 4,214,196 A | 7/1980 | Boyce | |
| 4,217,527 A | 8/1980 | Bourke et al. | |
| 4,707,777 A | 11/1987 | Cho | |
| 5,341,280 A | 8/1994 | Divan et al. | |
| 6,441,506 B2 | 8/2002 | Nakashima | |
| 6,469,469 B1 | 10/2002 | Chambers et al. | |
| 7,046,531 B2 | 5/2006 | Zocchi et al. | |
| 7,923,944 B2 * | 4/2011 | Schulz et al. | 318/66 |
| 2001/0020789 A1 | 9/2001 | Nakashima | |
| 2005/0078431 A1 | 4/2005 | Iwatsuki et al. | |

* cited by examiner

*Primary Examiner* — Rexford N Barnie
*Assistant Examiner* — Hal Kaplan
(74) *Attorney, Agent, or Firm* — Luedeka, Neely & Graham, P.C.

(57) ABSTRACT

A power conversion apparatus includes an interfacing circuit that enables a current source inverter to operate from a voltage energy storage device (voltage source), such as a battery, ultracapacitor or fuel cell. The interfacing circuit, also referred to as a voltage-to-current converter, transforms the voltage source into a current source that feeds a DC current to a current source inverter. The voltage-to-current converter also provides means for controlling and maintaining a constant DC bus current that supplies the current source inverter. The voltage-to-current converter also enables the current source inverter to charge the voltage energy storage device, such as during dynamic braking of a hybrid electric vehicle, without the need of reversing the direction of the DC bus current.

15 Claims, 9 Drawing Sheets

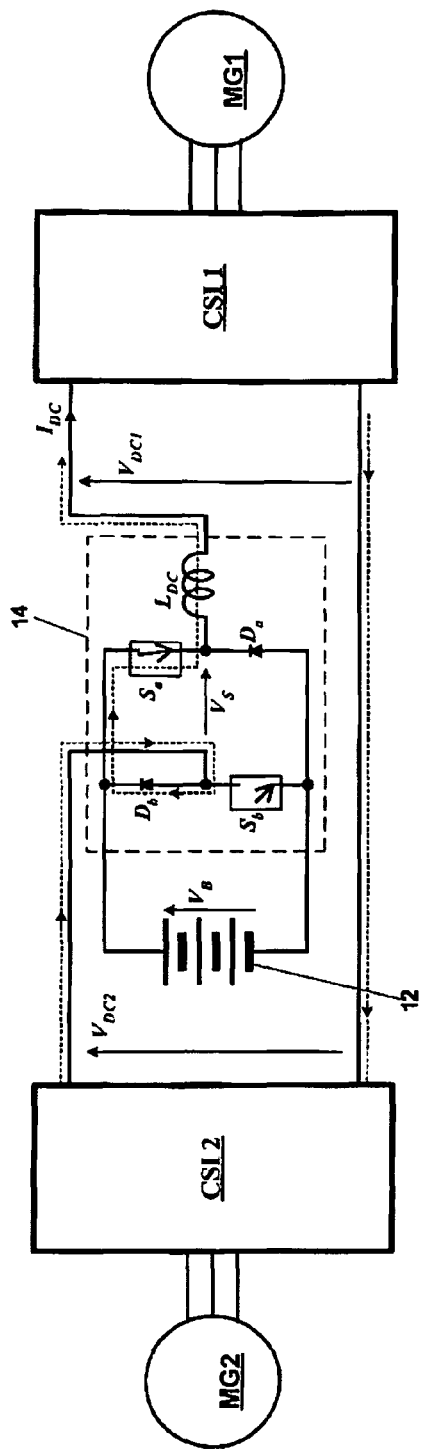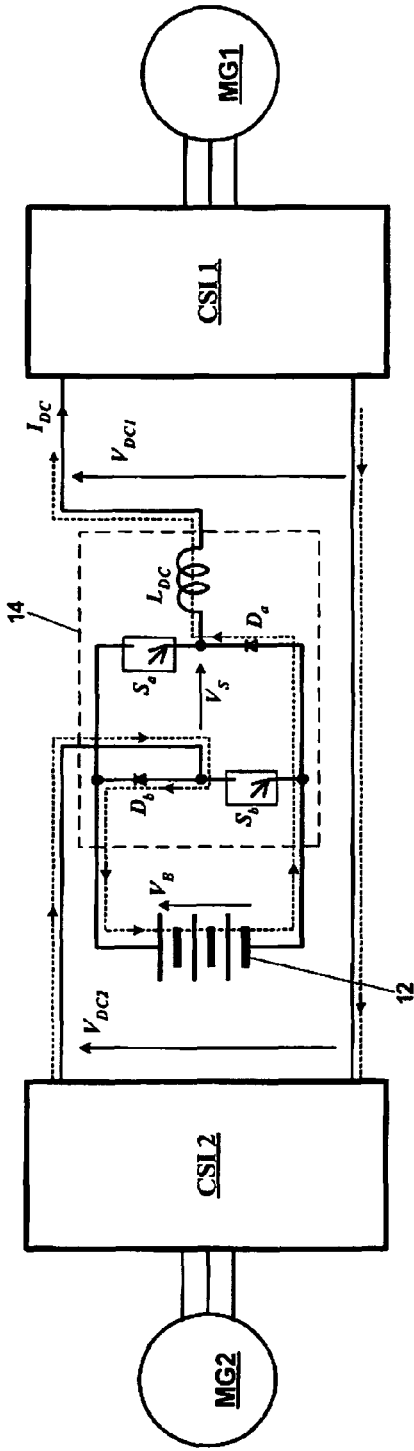
FIG. 6C
FIG. 6D

POWER CONVERSION APPARATUS AND METHOD

CROSS REFERENCES TO RELATED APPLICATIONS

This patent application claims priority from and is related to U.S. Provisional Patent Application Ser. No. 61/042,036 filed Apr. 3, 2008, entitled POWER CONVERSION APPARATUS AND METHOD. Patent Application Ser. No. 61/042,036 is incorporated by reference in its entirety herein.

GOVERNMENT RIGHTS

This invention was made with government support under Contract No. DE-AC05-00OR22725 awarded by the U.S. Department of Energy. The government has certain rights in the invention.

FIELD

This invention relates to apparatuses and methods for converting a direct-current (DC) voltage source into a multiphase alternating-current (AC) current source for powering electrical motors in hybrid electric vehicles, electric vehicles and other electrical motor drive applications.

BACKGROUND

The use of electric vehicles (EVs) has been promoted in recent years to reduce oil consumption and the emissions of harmful pollutants and carbon dioxide. EVs may include battery powered vehicles, fuel cell powered vehicles and hybrid electric vehicles (HEVs). Commercially available HEVs typically employ a battery and an electrical motor drive system that are sized to optimize the energy efficiency of an internal combustion engine (ICE) and to capture a portion of the kinetic energy generated through dynamic braking by the motor during deceleration. Generally, an electrical motor drive system may include one or more drive units, each consisting of a power inverter and a motor. Multiple electrical drive units can be used to provide four-wheel drive capabilities. The power inverter may function as an inverter to convert a DC voltage to an AC voltage suitable to operate the motor. The power inverter may also function as a power converter when the motor is operating in power generation mode.

Most power inverters in current HEVs operate from a DC voltage source, such as a battery, and thus are referred to as voltage source inverters (VSIs). A typical VSI consists of six semiconductor switches arranged in three pairs connected in parallel with each switch pair connected in series. Such a VSI produces a three-phase AC voltage for powering a three-phase AC motor, where the amplitude of the AC voltage is lower than the amplitude of the DC source voltage. Multiple VSIs may be connected to the same DC source and control multiple motors. A DC-DC converter may be used to increase the amplitude of the output voltages beyond the source voltage to operate the motors at higher speeds.

FIG. 1 depicts an example of a dual electrical motor drive system that may be used in a series configuration HEV or a power-split series/parallel configuration HEV. This drive system consists of a battery, a DC-DC converter, a DC bus capacitor ($C_{dc}$), two three-phase VSIs (VSI1 and VSI2), two motor/generators and fourteen switches, $S_1$-$S_{12}$, $S_a$ and $S_b$. Each of the switches may comprise power semiconductor devices, such as an insulated-gate-bipolar-transistor (IGBT) and diode in anti-parallel connection or a Metal-Oxide-Semiconductor-Field-Effect-Transistor (MOSFET). An electronic controller (not shown in the figure) based on one or more microprocessors is typically used to control the operations of the electrical motor drive system. The inverter bus voltage, $V_{dc}$, is raised to a preferred level that is higher than the battery voltage, $V_B$, by the DC-DC converter. In typical operation, one electric motor is operated as a generator driven by an ICE to power the DC bus through the control of the corresponding VSI, and the other electric motor is operated in the motoring mode to supply a driving force to the wheels of the vehicle. Through the proper control of the DC-DC converter, the battery either supplies or absorbs the difference between the power produced by the generator and the power demanded by the motor to handle the variations in the driving force. During dynamic braking, the motor also operates in regenerative mode to produce an AC voltage which is converted to a high-level DC voltage by the VSI. The high-level DC voltage is then reduced by the DC-DC converter to a level suitable for charging the battery. Accordingly, the battery is charged by the generator and the motor.

The use of VSIs in motor drive systems introduces several drawbacks that make it difficult to meet requirements for cost, volume and lifetime for HEV applications. A VSI requires a very high performance DC bus capacitor to maintain a near ideal voltage source and to absorb large ripple currents typically generated by the switching of the motor currents. Currently available capacitors that can meet the demanding requirements of this application are costly and bulky, and their ripple current capability drops rapidly as the ambient temperature increases. The cost and volume of the DC bus capacitor limits the capability of a VSI to operate in elevated temperature environments. A low-temperature liquid cooling system is therefore needed to operate a VSI in the engine compartment of an HEV. Moreover, the reliability of the VSI is limited by the DC bus capacitor and is further hampered by possible short circuits of the phase legs making up a VSI (such as $S_1$-$S_2$, $S_3$-$S_4$, and $S_5$-$S_6$ in FIG. 1). In addition, as shown in FIG. 2, steep rising and falling edges of the pulse trains in the output voltage, $v_{ao}$, generate high electromagnetic interference (EMI) noises, impose high stress on the motor insulations, produce high frequency losses in the copper windings and iron cores of the motor, and generate bearing leakage currents that erode motor bearings over time.

Many of these problems can be eliminated or significantly relieved by the use of another type of inverter, the current source inverter (CSI). As shown in FIG. 3, a CSI operates from a current source $I_{DC}$ and it does not require any DC bus capacitors. A CSI can tolerate phase leg shoot-throughs, and as shown in FIG. 4, can provide both sinusoid-shaped voltage and current ($v_{ao}$ and $i_{am}$) to the motor. Whereas a VSI produces a voltage pulse train, a CSI generates a current pulse train in each phase output. The current pulse train is generated by turning on and off the switches $S_1$-$S_6$ in the bridge according to a pulse-width modulation (PWM) strategy. The pulsed phase currents are then filtered by a simple filter network of three capacitors, $C_a$, $C_b$ and $C_c$. This provides nearly sinusoidal currents as well as nearly sinusoidal voltages to the electric motor. The nearly sinusoidal voltages provided by the CSI are preferable to the pulse train generated by the VSI because they eliminate the problems described above that are associated with the steep rising and falling edges of the VSI pulses. The switches $S_1$-$S_6$ of the CSI should be able to withstand the rated voltage of the CSI in both forward and reverse directions. This generally requires the use of IGBTs with voltage blocking capability in both directions. Alternatively, these switches may be realized by connecting a diode in series with an IGBT or MOSFET that has only forward voltage blocking capability.

Although CSIs offer some advantages over VSIs, they cannot be used as direct replacements for VSIs in HEV applications. Commercially viable HEV energy storage devices, such as batteries and ultracapacitors, are in the form of voltage sources, and thus cannot be used directly as a power source for a CSI. Simply putting an inductor in series with a battery for powering a CSI motor drive has at least two problems: (1) the CSI cannot control the motor current at speeds below a certain point determined by the battery voltage, and (2) the CSI cannot charge the battery during dynamic braking. The difficulties of incorporating energy storage devices into a CSI have so far prevented application of the CSI in HEVs.

SUMMARY

Typical embodiments described herein provide a novel power conversion apparatus to solve the aforementioned problems. The power conversion apparatus includes an interfacing circuit that enables a current source inverter to operate from a voltage energy storage device (voltage source), such as a battery, ultracapacitor or fuel cell. The interfacing circuit, referred to herein as a voltage-to-current converter, transforms the voltage source into a current source that feeds a DC current to a current source inverter. The voltage-to-current converter also provides means for controlling and maintaining a constant DC bus current that supplies the current source inverter. The voltage-to-current converter also enables the current source inverter to charge the voltage energy storage device during dynamic braking without the need of reversing the direction of the DC bus current.

One preferred embodiment provides a power conversion apparatus configured to operate in one of a plurality of operational modes. The power conversion apparatus includes a first electric machine and a second electric machine, each operable as a motor or as a generator as determined by the operational mode in which the power conversion apparatus is operating. A first current source inverter is electrically connected to the first electric machine and a second current source inverter is electrically connected to the second electric machine. A voltage-to-current source converter is electrically connected to the first current source inverter and the second current source inverter. An energy storage device is electrically connected to the voltage-to-current source converter. A controller determines the operational mode of the apparatus by controlling operation of the first current source inverter, the second current source inverter, and the voltage-to-current source converter.

In some preferred embodiments, the controller generates control signals to cause the power conversion apparatus to operate in one or more of the following operational modes:
an operational mode in which power from the second current source inverter and the energy storage device is provided to the first current source inverter to drive the first electric machine;
an operational mode in which power from the second current source inverter is provided to the first current source inverter to drive the first electric machine, and the energy storage device is bypassed;
an operational mode in which power from the second current source inverter charges the energy storage device and is provided to the first current source inverter to drive the first electric machine;
an operational mode in which power from the first current source inverter and the second current source inverter charges the energy storage device; and
an operational mode in which power from the energy storage device is provided to the first current source inverter to drive the first electric machine and to the second current source inverter to drive the second electric machine.

In some preferred embodiments, the controller generates control signals to control the voltage-to-current source converter to direct flow of an electric current between the first current source inverter, the second current source inverter and the energy storage device, where the flow of the electric current is determined based on the operational mode. In these embodiments, the operational modes include:
a first operational mode in which the electric current flows from the second current source inverter, through the energy storage device in a forward-biased direction, and into the first current source inverter,
second and third operational modes in which the electric current flows from the second current source inverter into the first current source inverter, while bypassing the energy storage device, and
a fourth operational mode in which the electric current flows from the second current source inverter, through the energy storage device in a reverse-biased direction to charge the energy storage device, and into the first current source inverter.

Another preferred embodiment provides a power conversion apparatus that includes an electric machine operable as a motor or as a generator as determined by the operational mode in which the power conversion apparatus is operating, a current source inverter electrically connected to the electric machine, a voltage-to-current source converter electrically connected to the current source inverter, an ultracapacitor bank electrically connected to the voltage-to-current source converter, a fuel cell stack electrically connected to the voltage-to-current source converter, and one or more controllers for determining the operational mode of the apparatus by controlling operation of the current source inverter, the voltage-to-current source converter, and the fuel cell stack.

Yet another preferred embodiment provides a power conversion apparatus that includes an electric machine operable as a motor or as a generator as determined by the operational mode in which the power conversion apparatus is operating, a current source inverter electrically connected to the electric machine, a voltage-to-current source converter electrically connected to the current source inverter, a fuel cell stack electrically connected to the voltage-to-current source converter, and one or more controllers for determining the operational mode of the apparatus by controlling operation of the current source inverter, the voltage-to-current source converter, and the fuel cell stack.

These various embodiments of the invention provide several advantages over conventional CSI and VSI configurations of the prior art. These advantages include (1) the ability to control the speed of a motor without limitations imposed by low battery voltage levels, (2) the ability to charge the battery during dynamic breaking of a hybrid-electric vehicle, (3) no need for bulky and costly DC bus capacitor banks, (4) the elimination of high electromagnetic interference (EMI) noises, high stresses on motor insulation, high-frequency losses and bearing-leakage currents caused by undesired steep changes in output voltage levels in pulse train waveforms, (5) no limitations on constant-power speed range, and (6) no need for a separate low-temperature cooling system to operate in elevated temperature environments associated with hybrid-electric vehicles.

BRIEF DESCRIPTION OF THE DRAWINGS

These and other advantages of various embodiments are apparent by reference to the detailed description in conjunction with the figures, wherein elements are not to scale so as to more clearly show the details, wherein like reference numbers indicate like elements throughout the several views, and wherein:

FIGS. 6A-6D depict four operational modes of the power conversion apparatus of FIG. 5;

DETAILED DESCRIPTION

Figure 1:
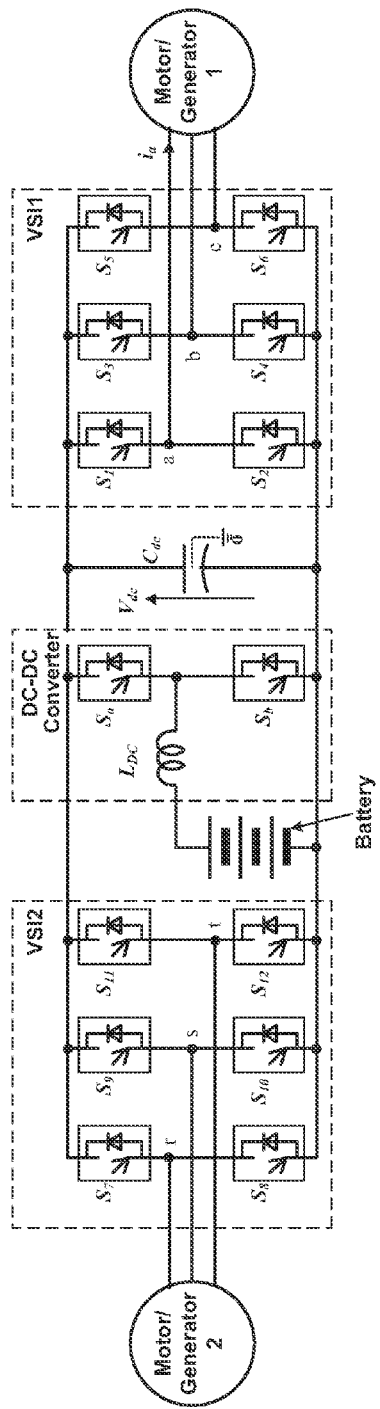
FIG. 1 depicts an example of a dual electrical motor drive system that incorporates two voltage source inverters.
Figure 2:
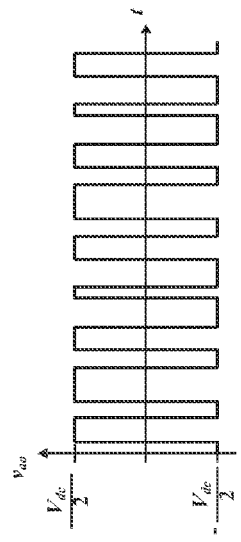
FIG. 2 depicts typical voltage and current waveforms produced by the voltage source inverters of FIG. 1.
Figure 2:
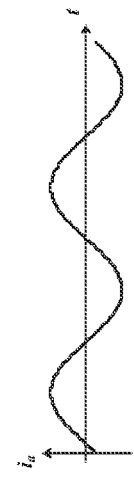
Figure 3:
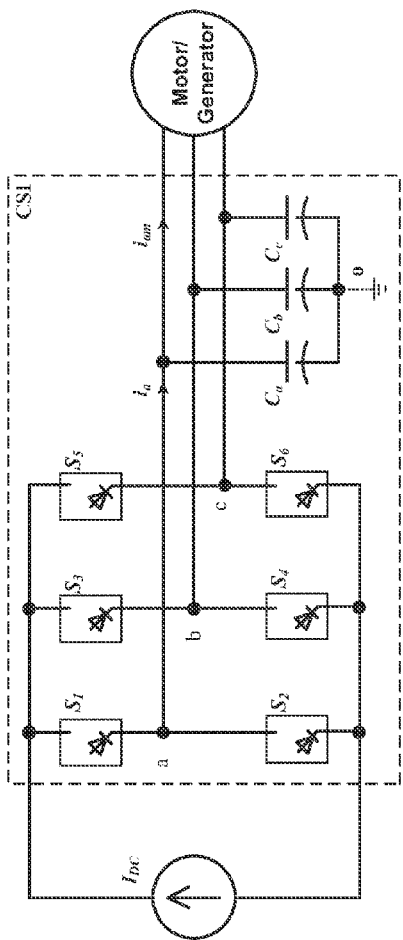
FIG. 3 depicts an example of a motor drive system that incorporates a current source inverter.
Figure 4:
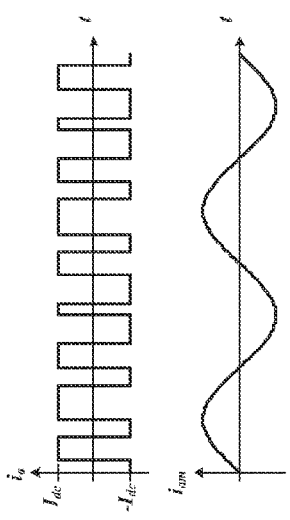
FIG. 4 depicts typical voltage and current waveforms produced by the current source inverters of FIG. 3.
Figure 5:
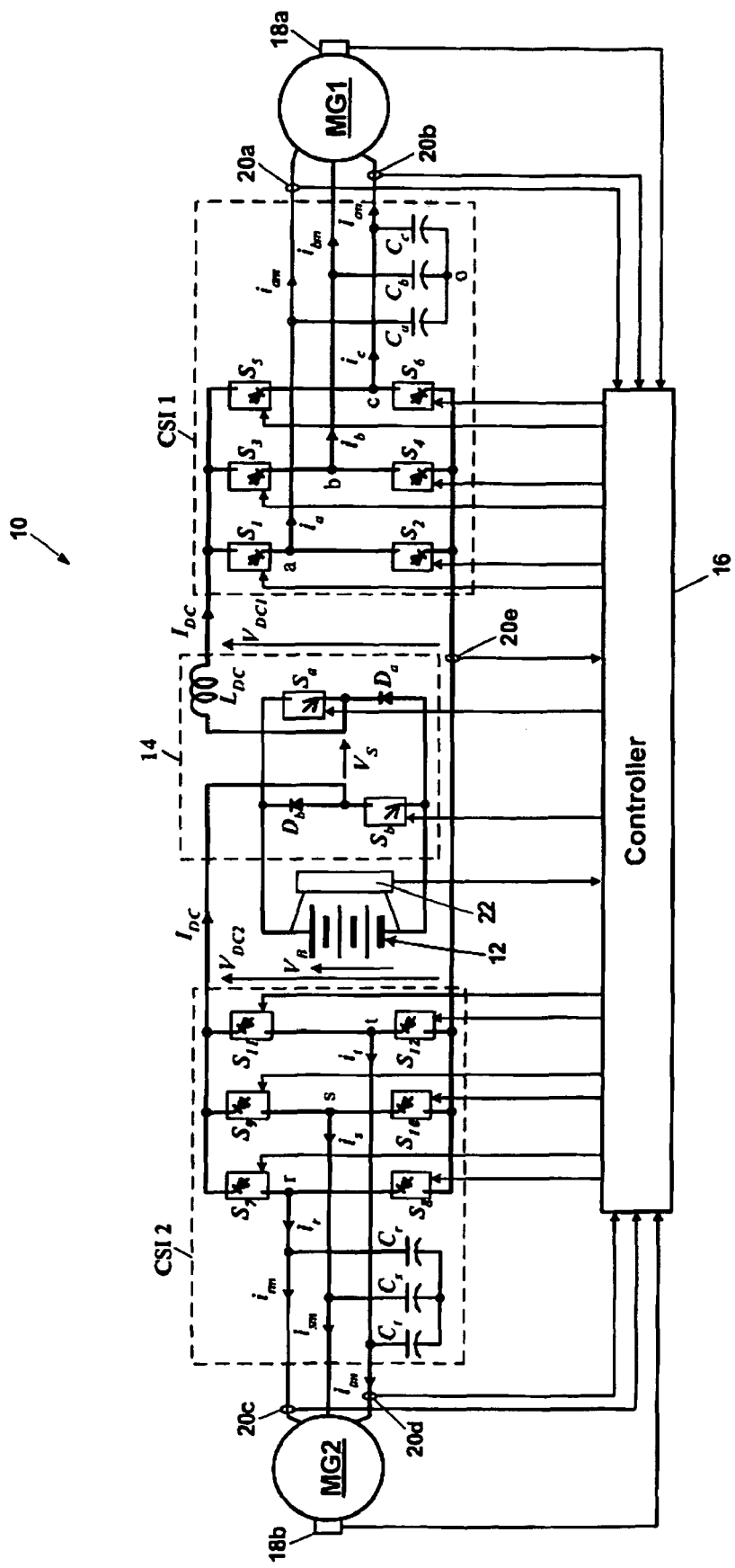
FIG. 5 depicts a power conversion apparatus according to a first embodiment.
Figure 6A:
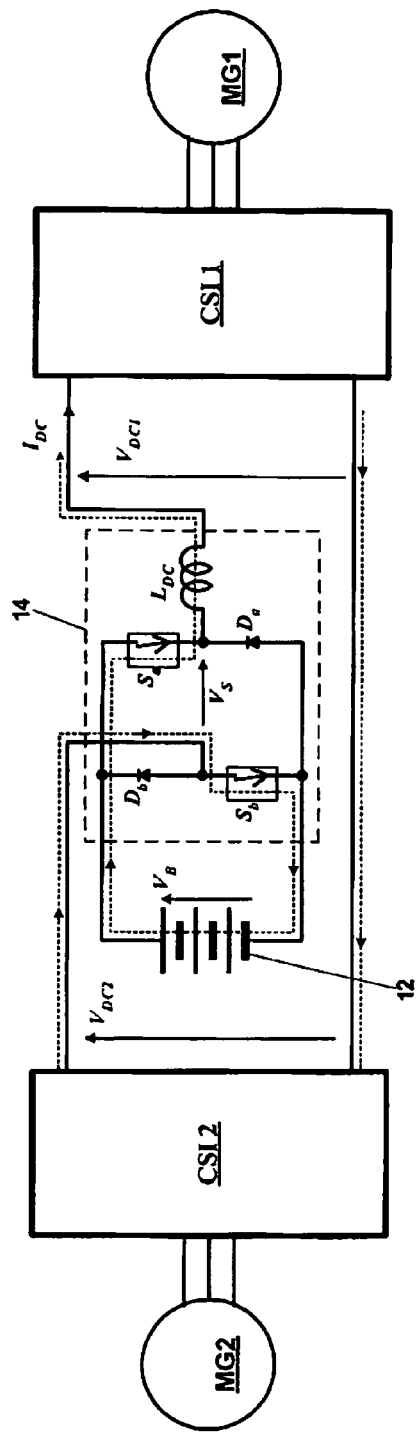
Figure 6B:
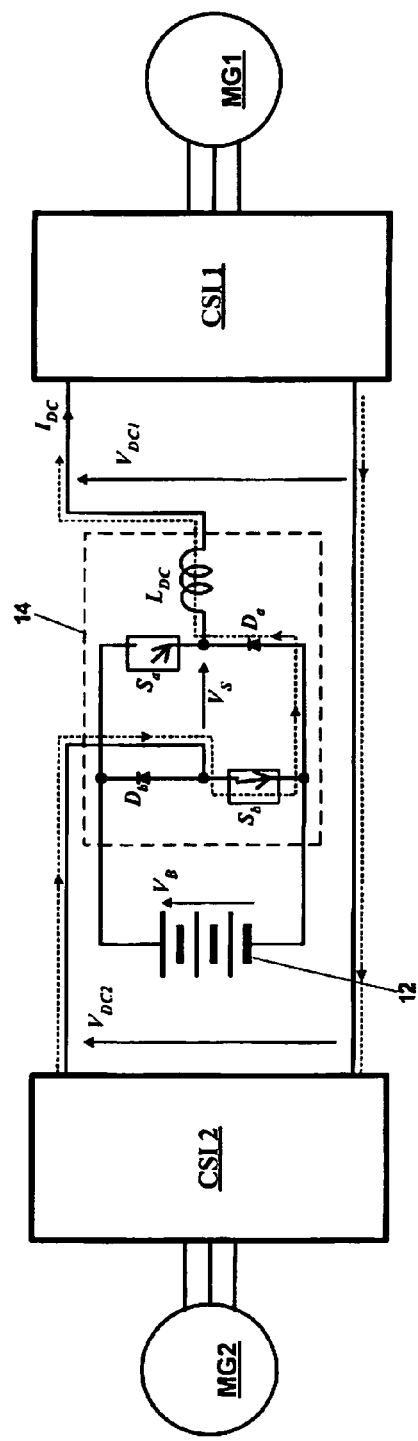

FIG. 5 depicts a first embodiment of a power conversion apparatus 10. The apparatus 10 includes an energy storage device 12, such as a battery which generates a battery voltage $V_B$, a voltage-to-current source (V-I) converter 14, two current source inverters CSI1 and CSI2, two electric machines MG1 and MG2 each of which may operate as a motor or a generator, and a controller 16. The two electric machines MG1 and MG2 are also referred to herein as a first electric machine MG1 and a second electric machine MG2. The two current source inverters CSI1 and CSI2 are also referred to herein as a first current source inverter CSI1 and a second current source inverter CSI2.

The V-I converter 14 includes two switches $S_a$ and $S_b$, two diodes $D_a$ and $D_b$, and a DC choke $L_{DC}$. The V-I converter 14 transforms the voltage source of the battery 12 into a current source for the inverter CSI1 by providing the capability to control and maintain a constant DC bus current, $I_{DC}$. The V-I converter 14 also enables the inverters CSI1 and CSI2 to charge the battery 12 during dynamic braking without the need for reversing the direction of the DC bus current.

The inverter CSI1 includes six switches $S_1$-$S_6$ and three AC capacitors $C_a$, $C_b$ and $C_c$. The inverter CSI2 also includes six switches $S_1$-$S_{12}$ and three AC capacitors $C_r$, $C_s$ and $C_t$. The controller 16 receives the measured rotor position and/or speed as sensed by sensors 18a and 18b, two measured phase currents $i_{am}$ and $i_{cm}$ of the motor MG1 as sensed by current sensors 20a and 20b, two measured phase currents $i_{rm}$ and $i_{tm}$ of the motor MG2 as sensed by current sensors 20c and 20d, the measured DC current $I_{DC}$ as sensed by current sensor 20e, and the measured battery voltage $V_B$ as sensed by voltage sensor 22. Based on these input signals, the controller 16 generates control signals for all the switches $S_1$-$S_{12}$, $S_a$ and $S_b$ so that each of the motors MG1 and MG2 produces a desired motor torque or speed as determined by a vehicle system controller while properly maintaining the state-of-charge of the battery 12.

In a preferred embodiment, the V-I converter 14 has four operational modes, referred to herein as Modes I, II, III and IV, as shown in FIGS. 6A-6D, respectively. In Mode I shown in FIG. 6A, switches $S_a$ and $S_b$ are both in an "on" (closed) state. In this condition, the sum of the output voltage $V_{DC2}$ of inverter CSI2 and the battery voltage $V_B$ is applied to inverter CSI1 through the inductor $L_{DC}$. Accordingly, the output voltage of the V-I converter 14 is the battery voltage. ($V_S$=$V_B$.) In Mode II shown in FIG. 6B, switch $S_b$ is in an on state and switch $S_a$ is in an "off" (open) state which electrically disconnects the battery 12 from the inverters CSI1 and CSI2 so that $V_S$=0. In Mode III shown in FIG. 6C, switch $S_a$ is in an on state and switch $S_b$ is in an off state. In this mode, the battery 12 is also electrically disconnected from the inverters CSI1 and CSI2 so that $V_S$=0. In Mode IV shown in FIG. 6D, both $S_a$ and $S_b$ are in an off state, and the DC current $I_{DC}$ flows through the diodes $D_a$ and $D_b$ to charge the battery 12. ($V_S$=$-V_B$.)

During any of the operational modes of the V-I converter 14, inverter CSI1 always generates a DC voltage $V_{DC1}$ across its DC input and a sinusoidally-modulated pulse train in each phase current $i_a$, $i_b$, or $i_c$. The current pulse train is generated by turning on and off the switches $S_1$-$S_6$ according to a chosen PWM strategy implemented in the controller 16. The pulsed phase currents $i_a$, $i_b$ and $i_c$ are then filtered by a simple filter network of the three capacitors $C_a$, $C_b$ and $C_c$. This produces near sinusoidal currents $i_{am}$, $i_{bm}$ and $i_{cm}$ and sinusoidal voltages $v_{ao}$, $v_{bo}$, and $v_{co}$ to drive the motor/generator MG1.

Similarly, CSI2 always generates a DC voltage $V_{DC2}$ across its DC output and a sinusoidally modulated pulse train in each phase current $i_r$, $i_s$ or $i_t$. The current pulse train is generated by turning on and off the switches $S_7$-$S_{12}$ according to a chosen PWM strategy implemented in the controller 16. The pulsed phase currents $i_r$, $i_s$ and $i_t$ are then filtered by a simple filter network of the three capacitors $C_r$, $C_s$ and $C_t$. This produces near sinusoidal currents $i_{rm}$, $i_{sm}$, and $i_{tm}$ to drive the motor/generator MG2.

Figure 7A:
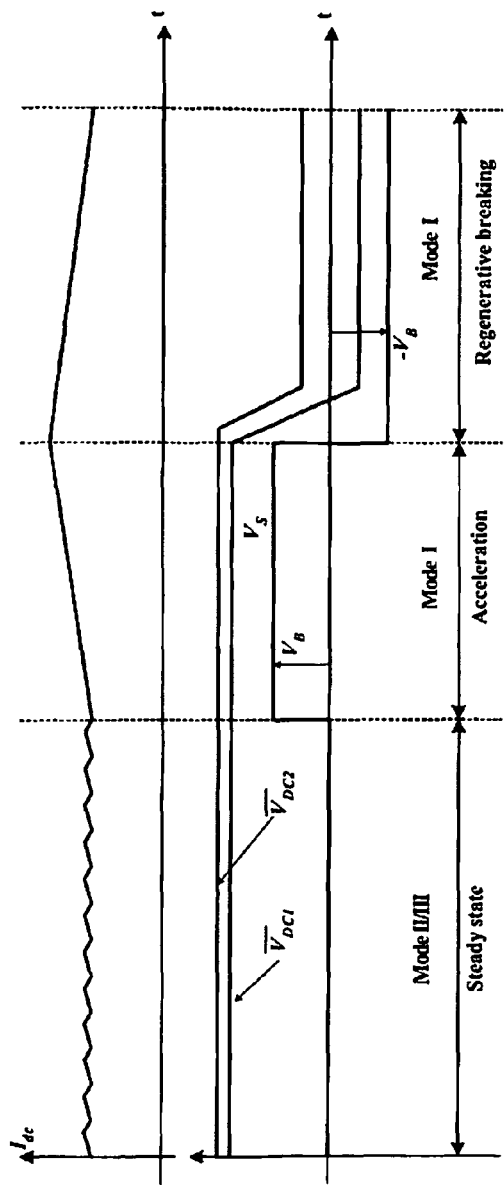
FIGS. 7A-7C depict operating waveforms generated by the power conversion apparatus of FIG. 5 at various load conditions.
Figure 7B:
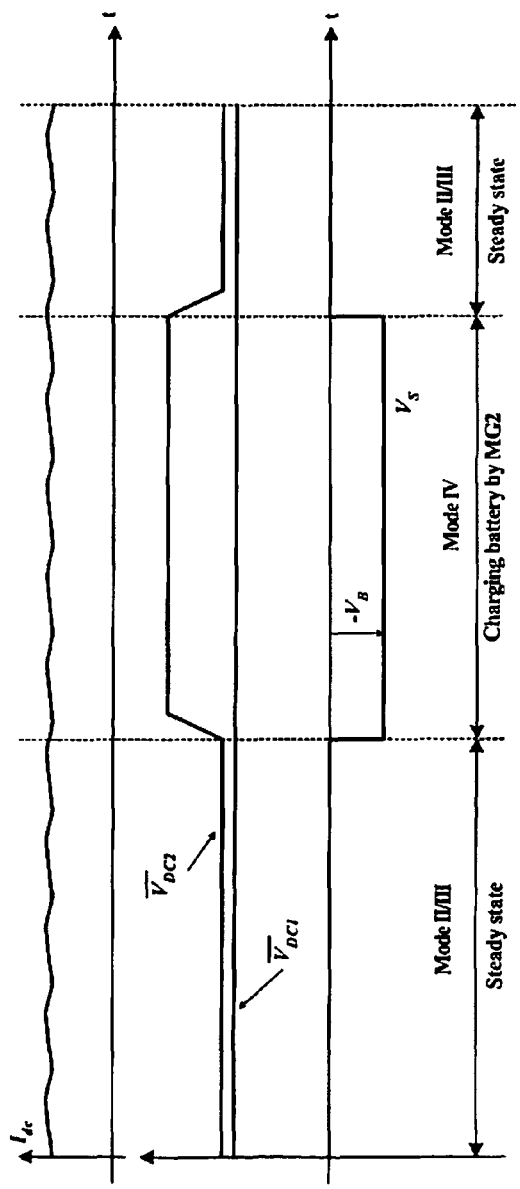
Figure 7C:
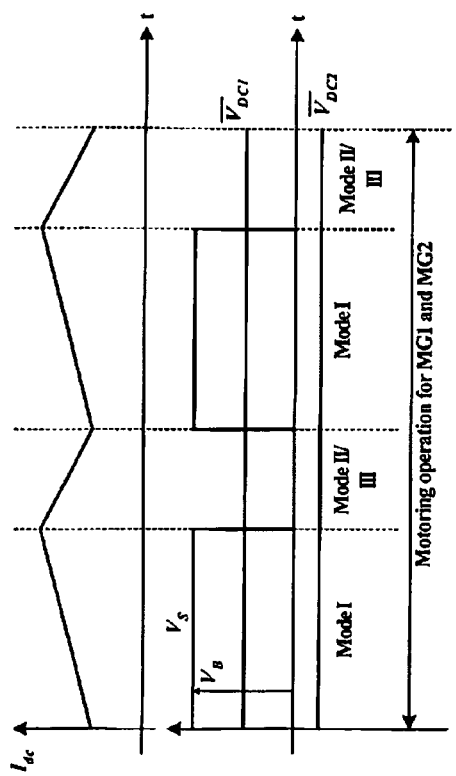

FIGS. 7A-7C illustrate operating waveforms at various load conditions of the motors/generators MG1 and MG2. Normally, MG2 operates as a generator and MG1 as a motor. In order to maintain a constant DC current $I_{DC}$, the average value of the output voltage $\overline{V}_{DC2}$ of the inverter CSI2 is controlled to be slightly higher than that of the output voltage $\overline{V}_{DC1}$ of the inverter CSI1 ($\overline{V}_{DC2}$>$\overline{V}_{DC1}$) to compensate for the voltage drops on the DC link connecting the two inverters. Under control of the controller 16, the V-I converter 14 alternates between Mode II and Mode III and the battery is bypassed, as shown in FIG. 7A. When battery power is needed for acceleration, the controller 16 causes the V-I converter 14 to switch to Mode I to increase the DC current $I_{DC}$. During regenerative operation of the motor/generator MG1, the output voltage $\overline{V}_{DC1}$ of the inverter CSI1 flips its polarity and the controller 16 causes the V-I converter 14 to switch to Mode IV to charge the battery 12. The inverter CSI2 may reduce its output voltage $\overline{V}_{DC2}$ to control the DC current $I_{DC}$. The battery 12 may also be charged by the motor/generator MG2 by increasing the output voltage $\overline{V}_{DC2}$ of the inverter CSI2 as shown in FIG. 7B, where the motor/generator MG1 operates in motoring mode.

FIG. 7C depicts waveforms generated when both motor/generators MG1 and MG2 are operating in motoring mode powered by the battery 12. In this situation, the controller 16 causes the V-I converter 14 to alternate between Mode I and Mode II or Mode III to control the DC current $I_{DC}$.

Figure 8:
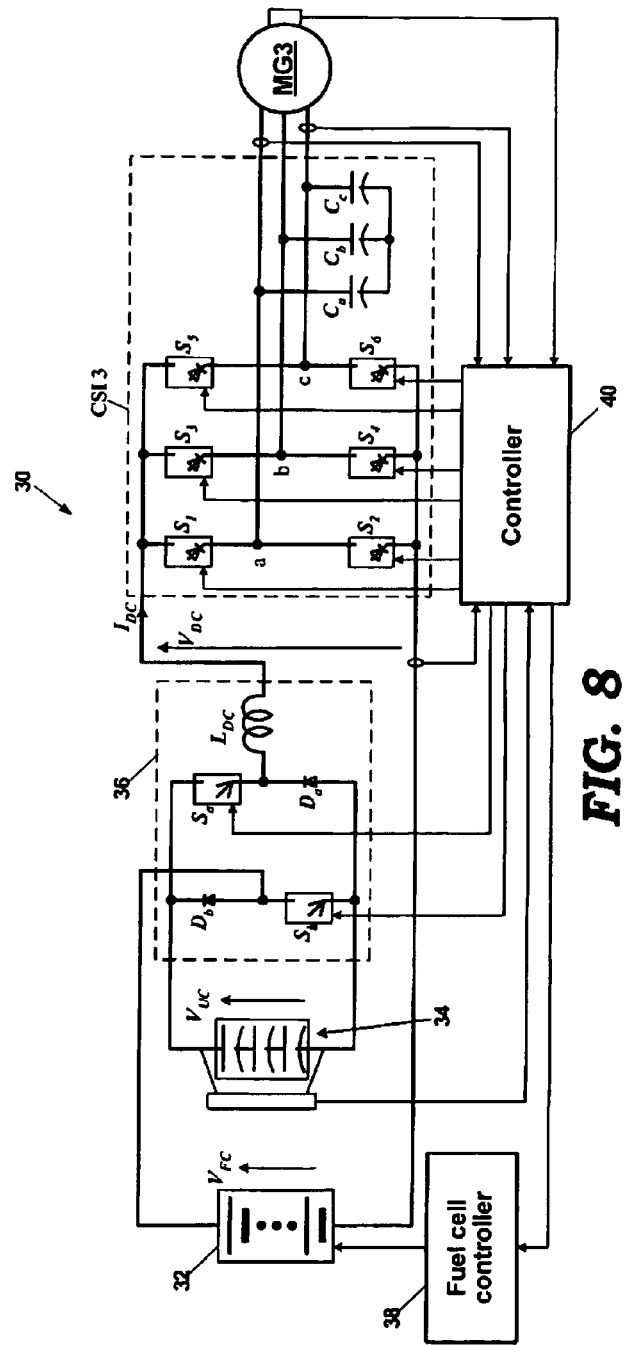
FIG. 8 depicts a power conversion apparatus according to a second embodiment.

FIG. 8 depicts a second embodiment of a power conversion apparatus 30 which includes a fuel cell stack 32, an ultracapacitor bank 34, a V-I converter 36, a current source inverter CSI3, a motor/generator MG3, a fuel cell controller 38 and an inverter controller 40. The fuel cell stack 32 has an anode connected to one output terminal of the V-I converter 36 and a cathode connected to the negative current rail of the inverter CSI3. During normal operation, the controller 40 causes either the switch $S_a$ or the switch $S_b$ of the V-I converter 36 to be closed, thereby bypassing the ultracapacitor 34. In this condition, the fuel cell stack voltage $V_{FC}$ is applied to the inverter CSI3 through an inductor $L_{DC}$ in the V-I converter 36 so that the motor/generator MG3 operates in the motoring mode. When the controller 40 closes both switches $S_a$ and $S_b$, the fuel cell stack 32 and the ultracapacitor 34 work in tandem to supply a combined voltage of $V_{UC}+V_{FC}$ to the inverter CSI3. On the other hand, when the controller 40 opens both switches $S_a$ and $S_b$, the DC current $I_{DC}$ charges the ultracapacitor bank 34. The motor/generator MG3 may operate in either motoring mode wherein the fuel cell 32 supplies power to charge the ultracapacitor 34 and the motor/generator MG3, or in regenerative mode wherein both the fuel cell 32 and the motor/generator MG3 supply power to charge the ultracapacitor 34.

Figure 9:
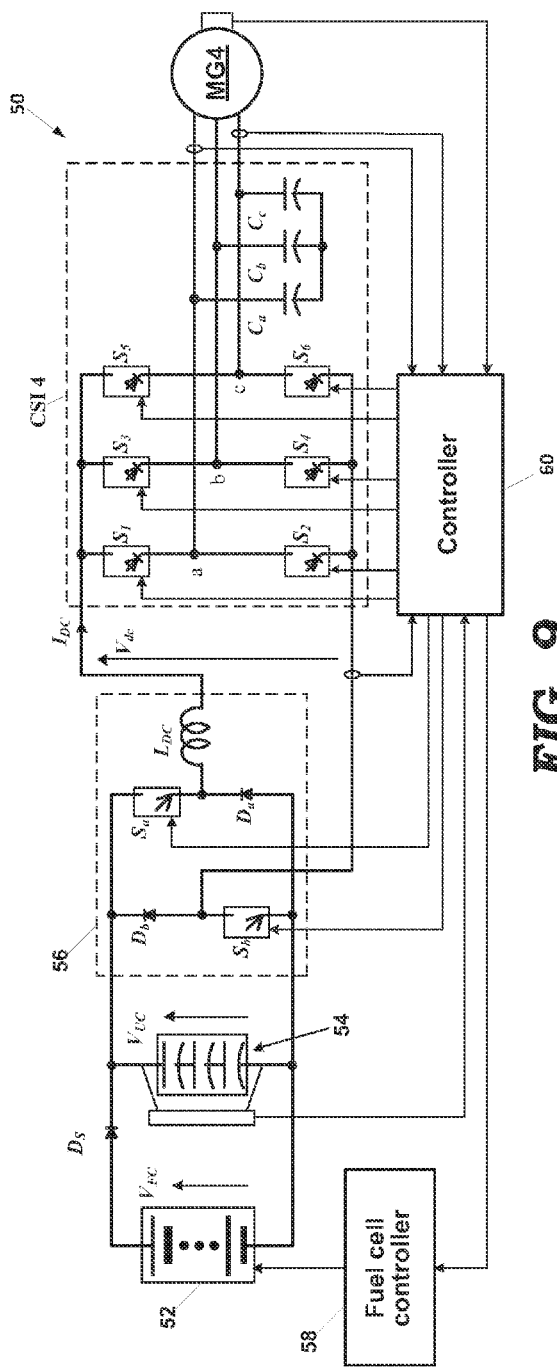
FIG. 9 depicts a power conversion apparatus according to a third embodiment.

FIG. 9 shows a third embodiment of a power conversion apparatus 50 which includes a fuel cell stack 52, a diode $D_S$, an ultracapacitor bank 54, a V-I converter 56, a current source inverter CSI4, a motor/generator MG4, a fuel cell controller 58 and an inverter controller 60. The fuel cell stack 52 is connected in parallel to the ultracapacitor bank 54 through the diode $D_S$. During normal operation, the fuel cell stack voltage $V_{FC}$ is adjusted by the fuel cell stack controller 58 to closely follow the ultracapacitor voltage $V_{UC}$. When the controller 60 closes both switches $S_a$ and $S_b$, the fuel cell stack 52 and the ultracapacitor 54 work in parallel to supply a voltage of $V_{FC}=V_{UC}$ to the inverter CSI4. In this condition, the fuel cell stack voltage $V_{FC}$ is applied to the inverter CSI4 through an inductor $L_{DC}$ in the V-I converter 56 so that the motor/generator MG4 operates in the motoring mode. When the controller 60 causes either the switch $S_a$ or the switch $S_b$ of the V-I converter 56 to be closed, the fuel cell stack 52 and the ultracapacitor bank 54 are bypassed. On the other hand, when the controller 60 opens both switches $S_a$ and $S_b$, the DC current $I_{DC}$ charges the ultracapacitor bank 54. As the ultracapacitor voltage $V_{UC}$ increases above the fuel cell voltage $V_{FC}$, the diode $D_S$ is reverse biased and the fuel cell stack 52 is electrically disconnected from the ultracapacitor bank 54. The motor/generator MG4 may operate in either motoring mode wherein the DC current $I_{DC}$ decreases, or in regenerative mode wherein the motor/generator MG4 supply power to charge the ultracapacitor bank 54.

Figure 10:
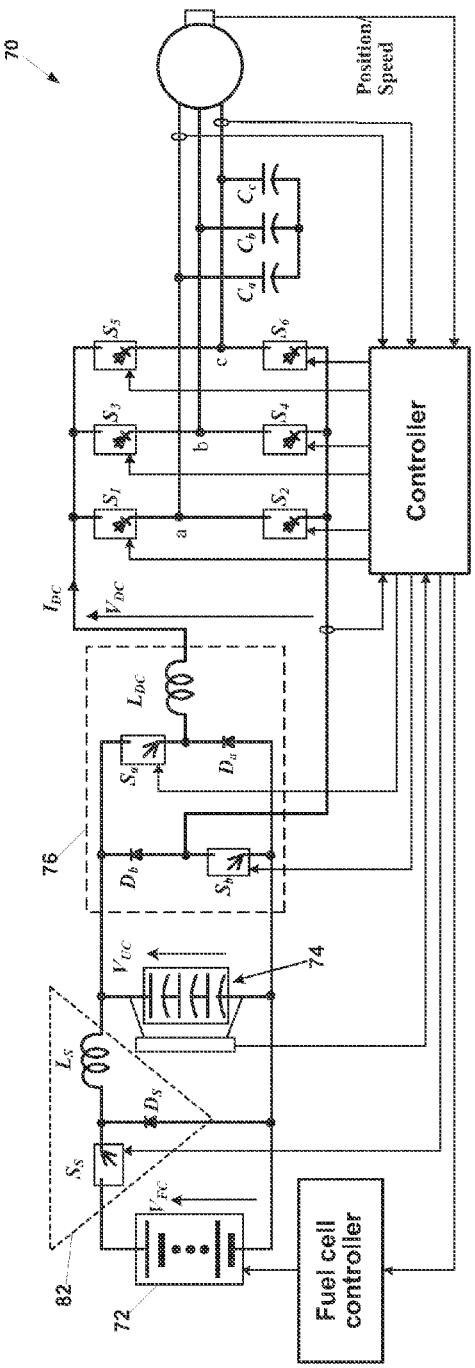
FIG. 10 depicts a power conversion apparatus according to a fourth embodiment.

FIG. 10 shows a fourth embodiment of a power conversion apparatus 70, where a fuel cell stack 72 is connected to an ultracapacitor bank 74 through a buck converter 82 consisting of a switch $S_S$, a diode $D_S$ and an inductor $L_S$. The higher fuel cell stack voltage $V_{FC}$ is reduced by the buck converter 82 to closely follow the ultracapacitor voltage $V_{UC}$.

Figure 11:
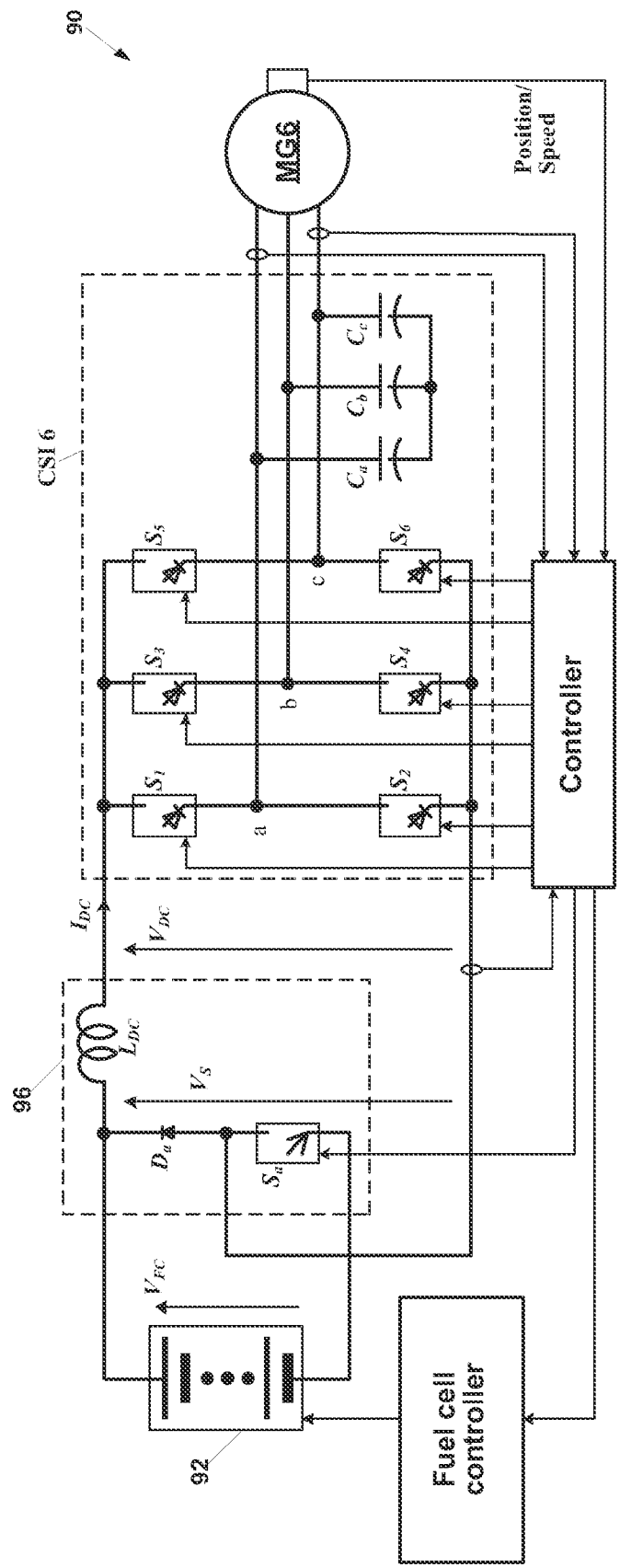
FIG. 11 depicts a power conversion apparatus according to a fifth embodiment.

FIG. 11 shows a fifth embodiment of a power conversion apparatus 90. In this embodiment, a current source inverter CSI6 is powered by a fuel cell stack 92 alone, without an energy storage device. Because the fuel cell stack 92 cannot be charged, the V-I converter 96 is simplified to consist of a switch $S_a$, a diode $D_a$ and an inductor $L_{DC}$. When the switch $S_a$ is closed, the diode $D_a$ is kept off. The DC current $I_{DC}$ is forced to flow through the switch $S_a$, the fuel cell stack 92, and the inductor $L_{DC}$ to supply power to the motor MG6. Opening the switch $S_a$ makes the DC current $I_{DC}$ flow through the diode $D_a$ and the inductor $L_{DC}$, thereby bypassing the fuel cell stack 92. The conduction duty ratio of the switch $S_a$ is controlled in such a way that the average voltage of $V_S$ approximately equals the average voltage of $V_{DC}$.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A power conversion apparatus configured to operate in one of a plurality of operational modes, the power conversion apparatus comprising:
   a first electric machine operable as a motor or as a generator as determined by the operational mode in which the power conversion apparatus is operating;
   a second electric machine operable as a motor or as a generator as determined by the operational mode in which the power conversion apparatus is operating;
   a first current source inverter electrically connected to the first electric machine;
   a second current source inverter electrically connected to the second electric machine;
   a voltage-to-current source converter electrically connected to the first current source inverter and the second current source inverter;
   an energy storage device electrically connected to the voltage-to-current source converter; and
   a controller for determining the operational mode of the apparatus by controlling operation of the first current source inverter, the second current source inverter, and the voltage-to-current source converter.

2. The power conversion apparatus of claim 1 wherein the controller generates control signals to determine the operational mode selected from the plurality of operational modes which include:
   at least one operational mode in which power from the second current source inverter and the energy storage device is provided to the first current source inverter to drive the first electric machine;
   at least one operational mode in which power from the second current source inverter is provided to the first current source inverter to drive the first electric machine, and the energy storage device is bypassed;
   at least one operational mode in which power from the second current source inverter charges the energy storage device and is provided to the first current source inverter to drive the first electric machine;
   at least one operational mode in which power from the first current source inverter and the second current source inverter charges the energy storage device: and
   at least one operational mode in which power from the energy storage device is provided to the first current source inverter to drive the first electric machine and to the second current source inverter to drive the second electric machine.

3. The power conversion apparatus of claim 1 wherein the controller generates control signals to control the voltage-to-current source converter to direct flow of an electric current between the first current source inverter, the second current source inverter and the energy storage device, and wherein in a first operational mode, the electric current flows from the second current source inverter, through the energy storage device in a forward-biased direction, and into the first current source inverter, in second and third operational modes, the electric current flows from the second current source inverter into the first current source inverter, while bypassing the energy storage device, and in a fourth operational mode, the electric current flows from the second current source inverter, through the energy storage device in a reverse-biased direction to charge the energy storage device, and into the first current source inverter.

4. The power conversion apparatus of claim 3 wherein the voltage-to-current source converter comprises a pair of diodes ($D_a$, $D_b$) and a pair of semiconductor switches ($S_a$, $S_b$) connected in a bridge configuration, and wherein in the first operational mode, the diodes ($D_a$, $D_b$) are reverse-biased and the switches ($S_a$, $S_b$) are closed, and the electric current flows from the second current source inverter, through the switch ($S_b$), through the energy storage device, through the switch ($S_a$), and into the first current source inverter, in the second operational mode, the diode ($D_b$) is reverse-biased, the diode ($D_a$) is forward-biased, the switch ($S_a$) is open, the switch ($S_b$) is closed, and the electric current flows from the second current source inverter, through the switch ($S_b$), through the diode ($D_a$), and into the first current source inverter, in the third operational mode, the diode ($D_b$) is forward-biased, the diode ($D_a$) is reverse-biased, the switch ($S_a$) is closed, the switch ($S_b$) is open, and the electric current flows from the second current source inverter, through the diode ($D_b$), through the switch ($S_a$), and into the first current source inverter, and in the fourth operational mode, the diodes ($D_a$, $D_b$) are forward-biased and the switches ($S_a$, $S_b$) are open, and the electric current flows from the second current source inverter, through the diode ($D_b$), through the energy storage device, through the diode ($D_a$), and into the first current source inverter.

5. The power conversion apparatus of claim 1 wherein the energy storage device comprises a battery or an ultracapacitor bank.

6. The power conversion apparatus of claim 1 for providing power to an electrically powered vehicle, wherein at least one of the operational modes provides for charging the energy storage device during dynamic braking of the vehicle.

7. The power conversion apparatus of claim 1 operable with no requirement for a DC bus capacitor bank.

8. The power conversion apparatus of claim 1 wherein
the first current source inverter includes six semiconductor switches controlled by the controller according to a pulse width modulation scheme to generate a sinusoidally-modulated pulse train in each of three phase currents which drive the first electric machine, and
the second current source inverter includes six semiconductor switches controlled by the controller according to a pulse width modulation scheme to generate a sinusoidally-modulated pulse train in each of three phase currents which drive the second electric machine.

9. A power conversion apparatus configured to operate in one of a plurality of operational modes, the power conversion apparatus comprising:
an electric machine operable as a motor or as a generator as determined by the operational mode in which the power conversion apparatus is operating;
a current source inverter electrically connected to the electric machine;
a voltage-to-current source converter electrically connected to the current source inverter;
an ultracapacitor bank electrically connected to the voltage-to-current source converter;
a fuel cell stack electrically connected to the voltage-to-current source converter; and
one or more controllers for determining the operational mode of the apparatus by controlling operation of the current source inverter, the voltage-to-current source converter, and the fuel cell stack.

10. The power conversion apparatus of claim 9 wherein the one or more controllers generate control signals to determine the operational mode selected from the plurality of operational modes which include:
at least one operational mode in which power from the fuel cell stack and the ultracapacitor bank is provided to the current source inverter to drive the electric machine;
at least one operational mode in which power from the fuel cell stack is provided to the current source inverter to drive the electric machine, and the ultracapacitor bank is bypassed;
at least one operational mode in which power from the fuel cell stack charges the ultracapacitor bank and is provided to the current source inverter to drive the electric machine; and
at least one operational mode in which power from the current source inverter and the fuel cell stack charges the ultracapacitor bank.

11. The power conversion apparatus of claim 9 wherein the one or more controllers generate control signals to determine the operational mode selected from the plurality of operational modes which include:
at least one operational mode in which the fuel cell stack and the ultracapacitor bank are connected in parallel to provide power to the current source inverter to drive the electric machine;
at least one operational mode in which the ultracapacitor bank alone provides power to the current source inverter to drive the electric machine;
at least one operational mode in which the fuel cell stack alone provides power to the current source inverter to drive the electric machine; and
at least one operational mode in which power from the current source inverter charges the ultracapacitor bank.

12. The power conversion apparatus of claim 9 wherein the fuel cell stack is electrically connected in parallel to the ultracapacitor bank through a diode.

13. The power conversion apparatus of claim 9 wherein the fuel cell stack is electrically connected in parallel to the ultracapacitor bank through a buck converter.

14. A power conversion apparatus configured to operate in one of a plurality of operational modes, the power conversion apparatus comprising:
an electric machine operable as a motor or as a generator as determined by the operational mode in which the power conversion apparatus is operating;
a current source inverter electrically connected to the electric machine;

a voltage-to-current source converter electrically connected to the current source inverter;
a fuel cell stack electrically connected to the voltage-to-current source converter; and
one or more controllers for determining the operational mode of the apparatus by controlling operation of the current source inverter, the voltage-to-current source converter, and the fuel cell stack.

15. The power conversion apparatus of claim 14 wherein the one or more controllers generate control signals to determine the operational mode selected from the plurality of operational modes which include:
    at least one operational mode in which power from the fuel cell stack is provided to the current source inverter to drive the electric machine; and
    at least one operational mode in which power from the fuel cell stack is not provided to the current source inverter to drive the electric machine.

\* \* \* \* \*